UNITED STATES PATENT OFFICE.

WILHELM ACKERMANN, OF BERLIN, GERMANY.

FLUX FOR USE IN SOLDERING.

940,111.  Specification of Letters Patent.  Patented Nov. 16, 1909.

No Drawing.  Application filed October 8, 1908.  Serial No. 456,712.

*To all whom it may concern:*

Be it known that I, WILHELM ACKERMANN, chemist, citizen of Germany, subject of the King of Prussia and Emperor of Germany, residing at Winsstrasse 35, Berlin, in the Kingdom of Prussia and Empire of Germany, have invented new and useful Improvements in Fluxes for Use in Soldering, of which the following is a specification.

The present invention relates to fluxes for use in soldering, and an important object is to provide a method for manufacturing a material similar to silicic water-glass.

If boracic acid is combined with an alkali within the limits of 3 to 4 molecules of anhydrous boracic acid ($B_2O_3$) to 1 molecule of alkali, for example sodium oxid ($Na_2O$), it is possible to make, with a quantity of water nearly amounting to the weight of the anhydrous substance, transparent viscous syrups which remain liquid even at ordinary temperatures for a comparatively long time, under certain circumstances for days and weeks. An alkali or any alkaline combination, as for instance, carbonate of soda or borax, may be used and combinations of boracic acid. Preferably aqueous materials with known contents of anhydrous substance are applied, adding only an additional quantity of water. For example, a mixture of 1 part by weight of commercial aqueous boracic acid ($B_2O_3 + 3H_2O$) and 3 parts by weight of ordinary borax containing ten molecules of water ($Na_2O.2B_2O_3 + 10H_2O$) contains sufficient water in order to at once form a thick syrup in the heat of the boiling water-bath. These syrups which have not been known heretofore have a remarkable adhesive force and leave behind, on surfaces to which they are applied, a transparent varnish-like coat; they are a true counterpart to silicic water-glass. This boracic water-glass is particularly suitable as a flux for hard solders instead of borax, not only generally, on account of its substantially increased power of cleansing metals, but also on other grounds. Firstly, the soldering syrup is exceedingly useful for preparing all articles which are to be soldered, especially when working on a large scale. The liquid which is as thick as oil can be applied uniformly like glue by a brush to the surfaces to be soldered, if necessary before they are bound together, and thus one may be certain of the presence of the flux in every part of the joint. Further, the great adhesive force of the syrup admits of the most extended objects, and even exposed parts of the same, being covered with solder, so that none of it falls off, even after long standing, when the solder is firmly cemented to the object. Likewise the syrup can be used for smaller soldering operations by dipping a match stick into the syrup and drawing a line over the joint to be soldered and then sprinkling finely divided solder over the line, the solder being placed clean and exactly in its place, as is not possible in a different manner. These syrups are suitable for soldering all metals with hard solder, but are particularly advantageous for brass. Whereas borax leaves behind after the soldering very hard crusts which can be removed quickly only by hammering or otherwise by troublesome corrosive action, when the residues of boracic water-glass cool they crack off from brass and similar alloys of their own accord and the last traces can be removed simply by a damp cloth. In addition, it is to be emphasized that the troublesome effervescence attached to the use of borax is not met with when boracic water-glass is used as a flux; whereas borax when heated rises like branches from its support, swells up, and when sinking into the fire gives the solder another position, the foamy structure of the freshly applied boracic water-glass, which moreover is considerably less effervescent, remains connected with its basis, also sinks together much more rapidly in the glowing fusion, and the solder which may have been raised up somewhat obtains its old place. When it stands for a somewhat long time the dried coats of the boracic water-glass are hardly blown up at all. It is to be understood that the boracic water-glass may also be used in its dried state when its adhesive quality is dispensed with but without sacrificing its other good qualities.

I am aware that a brazing compound composed of equal parts of anhydrous sodium borate and boracic anhydrid with water is known; but this mixture is a substance quite different from my combination and does not show the properties described above.

What I claim as my invention and desire to secure by Letters Patent is:

1. The method of manufacturing boracic water-glass consisting in heating a mixture containing boracic acid, an alkali and water in such proportions that three to four molecules of anhydrous boracic acid correspond to one molecule of the anhydrous alkali and to a quantity of water nearly equal to the weight of the anhydrous substance.

2. The method of manufacturing boracic water glass which consists in heating a mixture containing boracic acid, an alkaline sodium combination and water in such proportions that three to four molecules of anhydrous boracic acid correspond to one molecule of sodium oxid and to a quantity of water nearly equal to the weight of the anhydrous substance.

3. A hard solder flux consisting of three to four molecules of boracic acid, one molecule of an alkali, and water.

4. As a new article of manufacture, boracic water-glass consisting of three to four molecules of boracic acid, one molecule of sodium oxid and water.

5. Method of manufacturing boracic waterglass consisting in heating one part by weight of aqueous boracic acid ($B_2O_3+3H_2O$) with three parts by weight of borax containing ten molecules of water ($Na_2O.2B_2O_3+10H_2O$).

In testimony whereof I have hereunto set my hand in presence of two subscribing witnesses.

WILHELM ACKERMANN.

Witnesses:
HENRY HASPER.
WOLDEMAR HAUPT.